AUTOMATIC GAS AND ELECTRIC PRESSURE COOKER

Original Filed Sept. 27, 1945 3 Sheets-Sheet 1

INVENTOR
IRVING PAGE
BY
ATTORNEY

AUTOMATIC GAS AND ELECTRIC PRESSURE COOKER
Original Filed Sept. 27, 1945 3 Sheets-Sheet 2
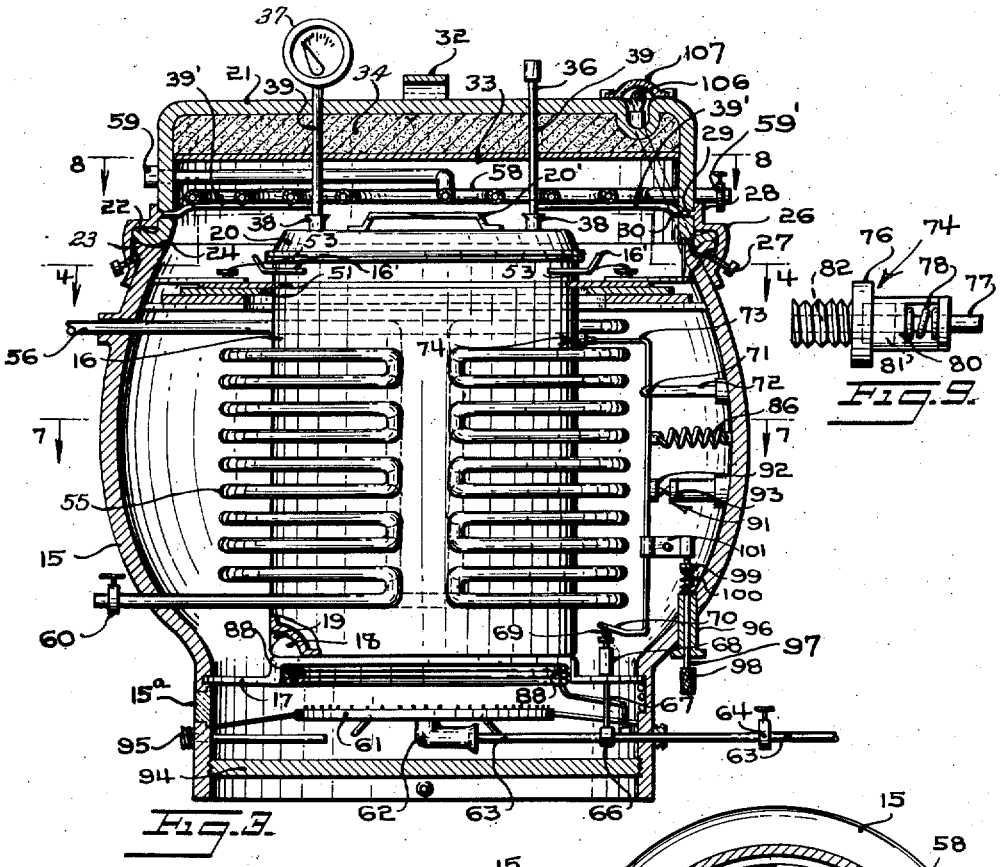
Fig. 3.
Fig. 9.
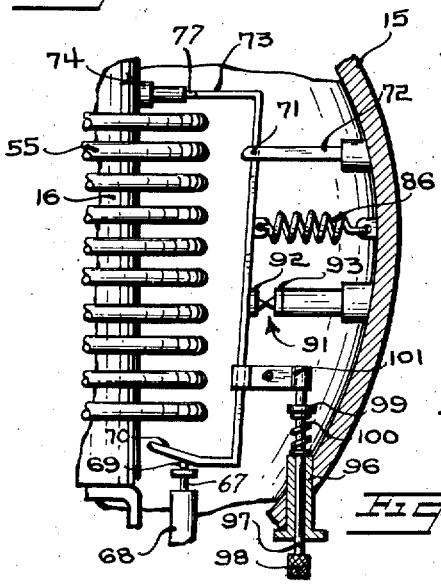
Fig. 10.
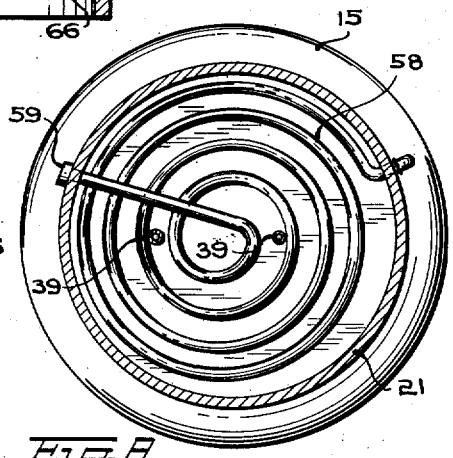
Fig. 8.
INVENTOR
IRVING PAGE
BY Zoltan Polachek
ATTORNEY

AUTOMATIC GAS AND ELECTRIC PRESSURE COOKER

Original Filed Sept. 27, 1945 3 Sheets-Sheet 3

INVENTOR
IRVING PAGE
BY Jeffrey H. Blackett
ATTORNEY

Reissued Sept. 1, 1953 Re. 23,709

UNITED STATES PATENT OFFICE 23,709

AUTOMATIC GAS AND ELECTRIC PRESSURE COOKER

Irving Page, New York, N. Y.

Original No. 2,537,695, dated January 9, 1951, Serial No. 618,850, September 27, 1945. Application for reissue December 29, 1951, Serial No. 264,109

8 Claims. (Cl. 219—43)

Matter enclosed in heavy brackets [ ] appears in the original patent but forms no part of this reissue specification; matter printed in italics indicates the additions made by reissue.

This invention relates to new and useful improvements in pressure cookers, and has more particular reference to an automatic gas and electric pressure cooker.

More particularly the invention proposes a new and improved pressure cooker or pot which is arranged to be heated by a gas flame, and by an electric winding. An automatic arrangement is proposed to control the supply of gas to the flame and the supply of electric current to the winding, so as to turn off the "heat" when the internal pressure of the pot reaches a predetermined amount. An arrangement is also proposed whereby one or both of the heating devices may be further operated so as to maintain the heat for a predetermined time to cook those foods, which require pressure as well as time. These foods which are cooked quickly when the predetermined pressure is reached are finished the first time that the automatic device works to shut off the heating devices.

The invention furthermore contemplates providing the pressure pot with a safety valve and a pressure gauge so that it may be safely operated.

It is also proposed to characterize the new pressure pot by the fact that it includes a container for a pot and a cover. Clamps are used to clamp the cover in position on the container. It is proposed to so arrange the clamps so that they operate to close vent openings formed in the container and serve to permit the escape of gases while the cover clamps are being loosened. It is proposed that the clamps control a switch which controls the circuit with the electric winding.

A novel arrangement is also proposed for cooling the pot so that when the cover is removed from the container, the pot is not too hot to be handled.

A novel way is proposed for holding the cover in position on the top of the pot.

Still further the invention proposes a new and improved gas and electric automatic pressure pot as briefly explained, which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 3 is a vertical sectional view taken on the line 3—3 of Fig. 2.

Fig. 8 is a horizontal sectional view taken on the line 8—8 of Fig. 3.

Fig. 9 is an enlarged detailed view of the pressure responsive device which operates the automatic control for the gas and electric heating devices.

Fig. 10 is a fragmentary enlarged detailed view of a portion of Fig. 3 but disclosing the parts in greater detail.

Figure 1:
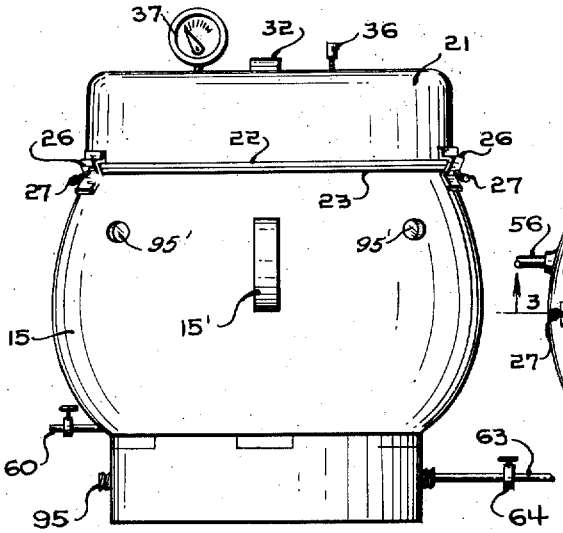
Fig. 1 is a side elevational view of a gas and electric automatic pressure pot constructed in accordance with this invention.

The new and improved gas and electric automatic pressure pot in accordance with this invention, includes a container 15 adapted to receive and hold the pot 16 in which food may be placed for cooking. The pot 16 has handles 16′ and the container 15 has handles 15′. The container 15 has a horizontal bottom spider-like partition 17 upon which the pot 16 may rest. This partition 17 is provided with a projection 18 at one point which engages a complementary groove 19 formed in the pot 16 by which it is possible to position the pot 16 in identical positions on the partition 17. The pot 16 is provided with a cover 20 having a handle 20′.

The container 15 is provided with a cover 21 having a rim 22 adapted to rest upon a rim 23 formed upon the top of the container 15. The rims 22 and 23 have parallel interengaged surfaces 24 for assisting in sealing the cover 21 on the container 15. Clamp means is provided for clamping the cover 21 in position. These clamp means include clamps 26 engageable over the rims 22 and 23 and provided with clamp screws 27 which may be tightened to tighten the clamps in position on the rims 22 and 23 for clamping the cover 21 in position.

Each clamp 26 is provided with a projecting end portion 28, which have small plug-like portions 29 normally engaging into vent openings 30 formed in the cover 21 and connecting with tubes 39' which connect with tubes 39. The arrangement is such that when the clamps 26 are tight then the plug-like projections 29 engage the vents 30 and tightly seal the tubes 39'.

A handle 32 is mounted upon the top of the cover 21 by which the cover 21 may be easily gripped and moved. A partition 33 divides off a top section of the cover, which is filled with asbestos 34, or other heat insulation material for preventing the top of the cover from becoming too hot. A safety valve 36 and a pressure gauge 37 are mounted on the projected top ends of the tubes 39 which extend through the cover 21 for cooperation with the pot 16. More particularly the cover 20 of the pot 16 is provided with funnel portions 38 which communicate with the interior of the pot 16. The tubes 39 of the safety valve 36 and the pressure gauge 37 fit into and tightly engage the funnels 38 when the cover 20 is correctly positioned on the pot 16 and the cover 21 is mounted upon the container 15.

Figure 5:
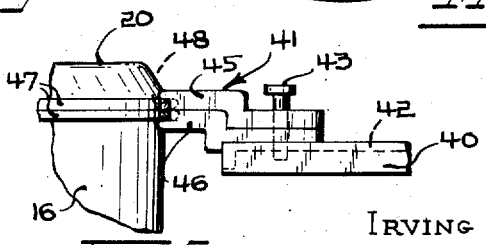
Fig. 5 is a fragmentary enlarged elevational view looking in the direction of the line 5—5 of Fig. 4.
Figure 5A:
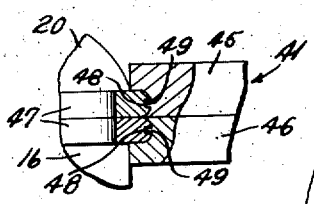
Fig. 5A is an enlarged detailed view of a portion of Fig. 5 having portions thereof broken away to reveal detailed construction.

The interior of the container 15 is provided with opposed shelves 40 upon which clamps 41 are mounted. These clamps 41 are slidable in tracks 42 on the shelves 40. The clamps 41 are capable of being clamped in several adjusted positions. Clamp screws 43 engage through the clamps 41 and are cooperative with series of openings 44 formed upon the shelves 40. The clamps 41 comprise a pair of clamp jaws 45 and 46 which are engageable with flanges 47 formed on adjacent portions of the cover 20 and pot 16, see Figs. 5 and 5A. These flanges 47, at one point, are formed with very small recesses 48 into which small projections 49 on the jaws 45 and 46 engage, see Fig. 5A, for correctly securing the cover 20 upon the pot 16 so that the funnels 38 will align with the tubes 39.

The opposed edges of the shelves 40 are formed with tracks 50 within which semi-circular slides 51 are slidably mounted. Clamp screws 53 are cooperative with the slides 51 to hold them in extended and retracted positions. The screws 53 are mounted upon the lowermost members 51 and pass through slots 54 formed in other members 51. In this way it is possible to clamp the members 51 in extended or retracted positions. In extended positions the members 51 are capable of engaging about the sides of the pot 16 for assisting in holding the pot centrally within the container 15. In retracted positions the members 51 may engage several different sizes and shapes of pots.

A cooler system is associated with the container 15 and the cover 21 by which it is possible to cool off the pot 16. This cooler system includes a water coil 55 engaged around the pot 16. The coil 55 has an inlet 56 extending out from the side of the container 15 and adapted to be connected by a water hose with a water faucet or other water supply and a valve controlled outlet 60. A water coil 58 is mounted within the cover 21. This coil 58 has an inlet 59 extending out from the side of the cover 21 and adapted to be connected with a water supply hose and a valve controlled outlet 59'.

A gas burner is provided for heating the pot 16. This gas burner is in the nature of the usual annular gas burner member 61. This member 61 is supported within the bottom of the container 15 below the partition 17. The gas burner member 61 has the usual inlet 62 for the air-gas mixture.

A gas supply pipe 63 is connected with the inlet 62 in the usual way. The gas pipe 63 extends through the sides of the container 15. A gas supply valve 64 is mounted upon the gas pipe 63 by which the gas may be controlled. An auxiliary automatic control valve 66 is mounted upon the gas pipe 63 within the container 15. This valve 66 has an operator stem 67 which extends upwards through a bushing 68 mounted upon the partition 17. The top of the stem 67 is provided with a knob 69 which is engaged by a cam arm 70. This cam arm 70 is supported by a pintle 71 upon a bracket 72 mounted within the container 15.

The upper end of the cam arm 70 is provided with an offset portion 73 which engages the side of a pressure responsive device 74 mounted on and through the wall of the pot 16. This pressure responsive device 74 is shown in detail in Fig. 9. It consists of a gland-like body 76 mounted on and through the wall of the pot 16. A plunger 77 projects from the outer end of the body 76. A loading spring 78 normally urges the plunger 77 inwards. The plunger 77 is connected with a piston 80 which slides in a cylinder 81 formed within the body 76. The cylinder 81 connects with a passage 82 which connects with the interior of the pot 16. When a predetermined pressure is reached within the pot 16, the piston 80 will be moved, compressing the spring 78 so that the plunger 77 is extended and engages the end 73 of the cam arm 70 pivoting the cam arm and causing the valve stem 67 to be moved downwards closing the valve 66. This cuts off the gas supply to the burner member 61. A contraction spring 86 acts between the cam arm 70 and the container 15 for normally tending to pivot the cam arm so that the offset end 73 maintains its position against the plunger 77.

Figure 2:
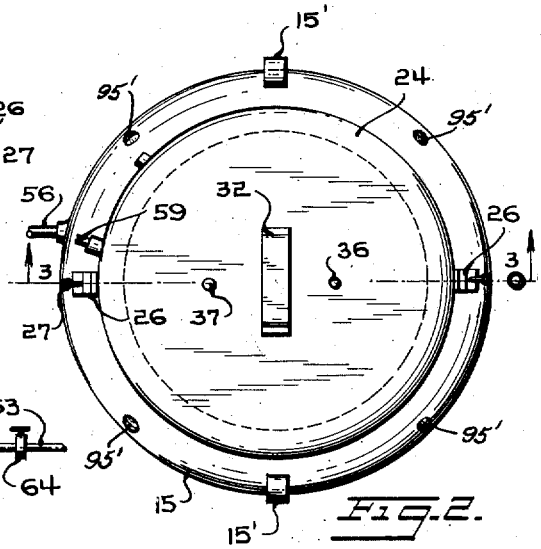
Fig. 2 is a plan view of Fig. 1.
Figure 4:
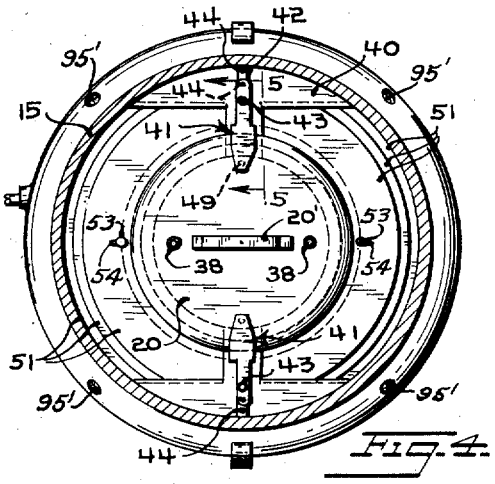
Fig. 4 is a horizontal sectional view taken on the line 4—4 of Fig. 3.
Figure 7:
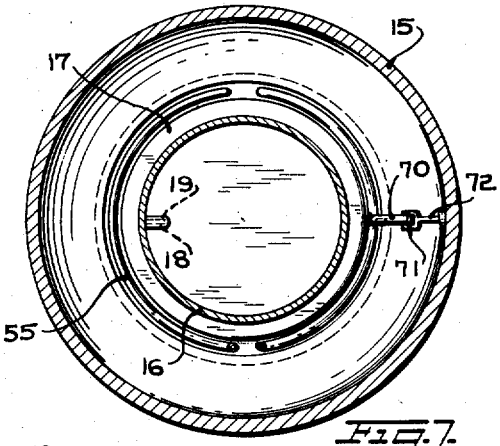
Fig. 7 is a horizontal sectional view taken on the line 7—7 of Fig. 3.
Figure 6:
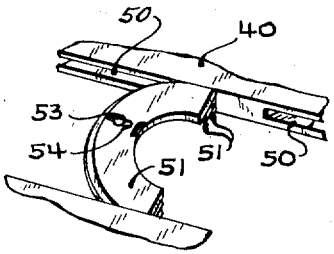
Fig. 6 is a perspective view of a portion of the interior of the container, specifically illustrating parts which assist in supporting the pot.

An electric heating winding 88 is mounted within the bottom of the container 15 below the partition 17. This electric heating winding 88 is connected in a circuit 89 which includes a manually operable switch 90 and an automatic switch 91. This automatic switch 91 consists of a contact arm 92 mounted upon the cam arm 70 and cooperative with a stationary contact arm 93 mounted within the container 15. When the cam arm 70 pivots to close the valve 66 the switch 91 automatically opens so as to open the electric circuit through the heating winding 88. The bottom of the container 15 is closed with a disc 94. An air inlet tube 95 is mounted through the side of the container and acts to supply air to the gas burner member 61 between the partition 17 and the disc 94 to support combustion. The gases resulting from combustion rise in the container 15 past the spider-like partition 17 and exhaust from the interior of the container 15 through the exhaust ports 95', see Figs. 1, 2 and 4. The heating winding 88 also serves as a pilot to light the gas burner 61. The container 15 has a colored glass window 15a opposite the burner 61 by which it is possible to see whether or not the burner is lit.

Figure 10A:
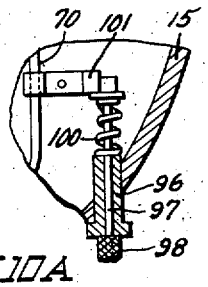
Fig. 10A is a view similar to a portion of Fig. 10, but illustrating a different position of the parts.

A latch is associated with the cam arm 70 for locking it in the position when the gas valve 66 is closed and the switch 91 is open. This latch includes a tubular gland 96 mounted through the wall of the container 15. A stem 97 passes through the gland 96. The outer end of the stem 97 has a handle 98 by which it may be moved. The inner end of the stem 97 is provided with a flange 99 against which an expansion spring 100 acts. This spring 100 tends to urge the stem 97 inward. A keeper element 101 is mounted upon the cam arm 70. Normally the stem 97 engages against the bottom face of the keeper 101. However, when the cam arm 70 pivots to close the valve 66 and open the switch 91, the stem 97 will move inward and engage the side of the keeper 101 locking the cam arm 70 in its pivoted position, see Fig. 10A.

Figure 11:
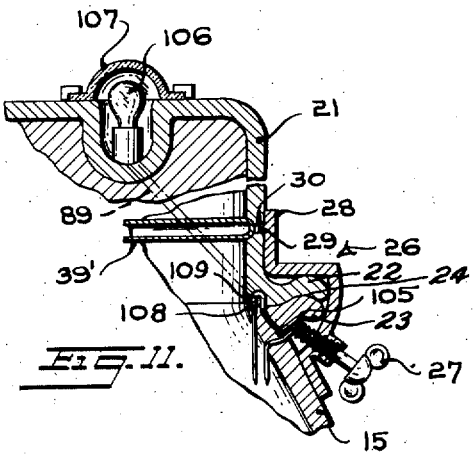
Fig. 11 is a fragmentary enlarged detailed view of a portion of Fig. 3, and more specifically the upper right-hand corner thereof.
Figure 12:
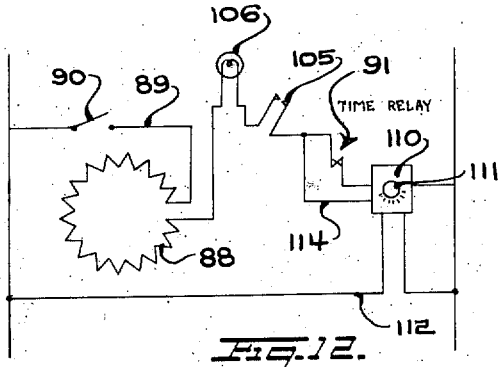
Fig. 12 is a schematic wiring diagram of the electric circuit of the device.
Figure 11A:
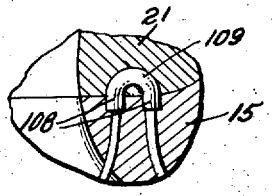
Fig. 11A is an enlarged detailed view of a portion of Fig. 11.

One of the clamps 26 controls a switch 105 connected in series in the circuit 89. This circuit also includes an indicator lamp 106. The switch 105 is of the type which is normally open. When the screw 27 of the clamp 26 is turned completely inwards, it forces the switch 105 closed, see Fig. 11. The lamp 106 is mounted upon the cover 21. A translucent guard 107 is mounted over the lamp 106. The circuit 89 extends from the cover 21 to the container 15 through contacts 108 and 109 on these parts, respectively, which engage each other when the cover 21 is in position on the container 15. The contact 108 of the container 15 are spaced and the contact 109 in the cover 21 bridges the contacts 108 when the cover 15 is in position on the container 15, see Fig. 11A.

The circuit 89 also includes a time switch 110. This time switch has an adjustment knob 111 by which it may be set. The time switch 110 controls the circuit 89. It is operated by a circuit 112. A shunt connection 114 from the time switch 110 shunts the automatic switch 91. The time switch 110 may be set to open the circuit 89 after a preselected time. Because of the shunt 114 the circuit 89 may be kept closed by the time switch 110 even though the automatic switch 91 is open, if this operation is desired.

The operation of the new and improved pressure pot may be understood from the following:

Let us assume that the pot is in the condition as illustrated in Fig. 3. In this condition the gas burner member 61 is being supplied with gas and the flame is heating the spider-like partition 17 and the pot 16. Since the switch 91 is closed the electric winding 88 is being supplied with electric current for heating the pot 16. When the internal pressure within the pot 16 exceeds a safe limit the safety valve 36 will act. The gauge 37 may be examined at any time to ascertain the pressure in the pot 16.

When the internal pressure of the pot 16 has reached a predetermined amount, depending upon the design of the spring 78 in the pressure responsive device 74, which may be replaced by other devices with springs of other design, the plunger 77 will be extended. When the plunger 77 moves outwards it pivots the cam arm 70 causing the valve 66 to be closed and the switch 91 to be open. This automatically turns off the supply of current to the heating winding 88 and closes off the supply of gas to the burner member 61. If it is desired to maintain cooking at the desired pressure and temperature it is merely necessary to release the cam arm 70 by disengaging stem 97 from keeper 101, and the spring 86 rotates the cam arm to its original position. This closes the switch 91 and supplies current to the heating coil 88. The valve 66 is reopened so that the gas is again supplied to the burner member 61 which will be ignited by the winding 88. If it is desired to solely use the electric heating device, the main valve 64 of the gas pipe 63 is turned off. When the internal pressure within the pot 16 again reaches the maximum, the plunger 77 will again project and again the cam arm 70 will function to reopen the switch 91. However, since it is possible to operate the pressure pot without the gas burner, it is merely a matter of design to so design the electric heating winding 83 that the pressure within the pot 16 will be closely maintained but not reached for a pre-determined time. For example, five minutes or ten minutes depending upon design.

When the cover 21 is mounted upon the container 15 and the clamps 26 are tightened for holding the cover in position, one of the clamp screws 27 will close the switch 105. This closes the circuit 89. The indicator lamp 106 lights up and indicates this fact. When the circuit 89 is closed the heating winding 88 becomes energized. It acts as a pilot for lighting the gas burner 61. The time switch 110 controls the circuit 89. The pressure responsive device 74 makes it possible to maintain selected pressures and temperatures within the pot 16 by pivoting the cam arm 70 against the action of the spring 86 to close the control valve 66 of the gas pipe 63. Such pivotal movement of the cam arm 70, under the influence of the pressure responsive device 74, also opens the switch 91 to open the circuit 89 and de-energize the heating coil 88.

After the food within the pot 16 has been cooked it is necessary to cool off the cover 20 and the pot 16. This may be done by opening the supply of water to the coils 55 and 58. After a short time the clamp screws 27 are loosened. If there is still internal steam or pressure within the pot 16, this pressure will escape through the vent openings 30 as the clamps 26 become loose. The cover 21 may now be safely removed and then the pot 16 with its cover 20 may be removed.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A gas and electric automatic pressure pot, comprising a container for a pot, a cover for said container, a pot removably mounted in said container, gas and electric heating means disposed within and supported by said container, said gas and electric heating means being positioned below said pot, said electrical heating means when energized initiating ignition of said gas means, and pressure responsive means connected with said pot for rendering said gas and electric means inoperative.

2. A gas and electric automatic pressure pot comprising a container for a pot, a cover for said container, a pot removably mounted in said container, gas and electric heating means disposed within and supported by said container, said gas and electric heating means being positioned below said pot, said electrical heating means when energized initiating ignition of said gas means, pressure responsive means connected with said pot for rendering said gas means inoperative, and manually operative means for restoring the operation of said gas and electric heating means.

*3. A gas and electric automatic pressure pot comprising a container for a pot, a cover for said container, a pot removably mounted in said container, gas and electric heating means disposed within and supported by said container, said gas and electric heating means being positioned below said pot, said electrical heating means when energized initiating ignition of said gas means, pressure responsive means connected with said pot for rendering said gas means inoperative, and manually operative means for restoring the operation of said gas and electric heating means, the container and its cover being provided with a water-cooling system adapted for manual control subsequently to the gas and electric heating means being rendered inoperative, thereby providing a pressure pot having controllable heating and cooling means.*

*4. A gas and electric automatic pressure pot comprising a container for a pot, a cover for said container, a pot removably mounted in said container, gas and electric heating means disposed within and supported by said container, said gas and electric heating means being positioned below said pot, said electrical heating means when energized initiating ignition of said gas means, pressure responsive means connected with said pot for rendering said gas means inoperative, and manually operative means for restoring the operation of said gas and electric heating means, the container being provided with a horizontal, bottom spider-like partition on which said pot rests, said pot and partition being provided with interengageable portions to ensure that the pot is always in the correct position for operation and use.*

*5. A gas and electric automatic pressure pot comprising a container for a pot, a cover for said container, a pot removably mounted in said container, gas and electric heating means disposed within and supported by said container, said gas and electric heating means being positioned below said pot, said electrical heating means when energized initiating ignition of said gas means, pressure responsive means connected with said pot for rendering said gas means inoperative, manually operative means for restoring the operation of said gas and electric heating means, a cover for said pot, funnel portions provided on said cover and communicating with the interior of said pot, a pressure gauge tightly fitting into and engaging one of said funnels and a safety valve tightly fitting into and engaging another of said funnels when the pot cover is correctly positioned on the pot and the container cover is in position, said pressure gauge and safety valve extending through the said container cover and projecting thereabove.*

*6. A gas and electric automatic pressure pot comprising a container for a pot, a cover for said container, a pot removably mounted in said container, gas and electric heating means disposed within and supported by said container, said gas and electric heating means being positioned below said pot, said electrical heating means when energized initiating ignition of said gas means, pressure responsive means connected with said pot for rendering said gas means inoperative, and manually operative means for restoring the operation of said gas and electric heating means, said pressure responsive means being mounted on and extending laterally through the pot wall and being actuated by the attainment of a predetermined pressure within the pot.*

*7. A gas and electric automatic pressure pot, comprising a container for a pot, a cover for said container, a pot removably mounted in said container, gas and electric heating means disposed within and supported by said container, said gas and electric heating means being positioned below said pot, said electrical heating means when energized initiating ignition of said gas means, and pressure responsive means connected with said pot for rendering said gas and electric means inoperative, said electrical heating means including a circuit having an automatic switch and a time switch either of which is capable of breaking said circuit, said circuit and switches being interconnected electrically so that the circuit may be maintained in closed condition by the time switch even when the automatic switch is open.*

*8. A gas and electric automatic pressure pot, comprising a container for a pot, a cover for said container, a pot removably mounted in said container, gas and electric heating means disposed within and supported by said container, said gas and electric heating means being positioned below said pot, said electrical heating means when energized initiating ignition of said gas means, pressure responsive means connected with said pot for rendering said gas and electric means inoperative, and manual means for rendering the gas heating means inoperative whereby the pressure pot is adapted to be operated by the electrical heating means alone.*

IRVING PAGE.

References Cited in the file of this patent

UNITED STATES PATENTS

| Number | Name | Date |
|---|---|---|
| Re. 864 | Prindle | Dec. 13, 1859 |
| 337,716 | Todd | Mar. 9, 1886 |
| 702,915 | Bocker | June 24, 1902 |
| 771,013 | Herdrich | Sept. 27, 1904 |
| 919,843 | Fish | Apr. 27, 1909 |
| 935,189 | Coles | Sept. 28, 1909 |
| 1,384,064 | Hettinger | July 12, 1921 |
| 1,530,416 | Saeki | Mar. 17, 1925 |
| 1,559,337 | McFarlane | Oct. 27, 1925 |
| 1,584,516 | Demuth | May 11, 1926 |
| 1,716,329 | Simpson | June 4, 1929 |
| 1,756,787 | Goughnour | Apr. 29, 1930 |
| 1,780,996 | Carroll | Nov. 11, 1930 |
| 1,804,130 | Starr | May 5, 1931 |
| 1,941,580 | Rosellini | Jan. 2, 1934 |
| 2,102,342 | Walder | Dec. 14, 1937 |
| 2,146,660 | Swartz | Feb. 7, 1939 |
| 2,152,122 | Wilcox | Mar. 28, 1939 |
| 2,308,603 | Graham | Jan. 19, 1943 |
| 2,369,932 | Allen | Feb. 20, 1945 |
| 2,392,077 | Wilson | Jan. 1, 1946 |
| 2,472,451 | Whitney | June 7, 1949 |
| 2,463,712 | Newell | Mar. 8, 1949 |

FOREIGN PATENTS

| Number | Country | Date |
|---|---|---|
| 76,550 | Sweden | Feb. 21, 1933 |
| 468,387 | France | Apr. 23, 1914 |